United States Patent [19]
Itoh et al.

[11] Patent Number: 5,760,120
[45] Date of Patent: Jun. 2, 1998

[54] LASER MARKING RESIN COMPOSITION

[75] Inventors: Hiroyuki Itoh, Yokkaichi; Yukiko Ito, Nagoya; Masaaki Mawatari, Suzuka; Hisao Nagai, Kuwana; Kazuo Miyamoto; Mitsuru Kawakita, both of Yokkaichi, all of Japan

[73] Assignee: Japan Synthetic Rubber Co., Ltd., Tokyo, Japan

[21] Appl. No.: 544,481

[22] Filed: Oct. 18, 1995

[30] Foreign Application Priority Data

Oct. 21, 1994 [JP] Japan ................... 6-282964

[51] Int. Cl.$^6$ ............ C08J 5/10; C08K 3/18; C08K 3/22; C08L 51/04
[52] U.S. Cl. ................... 524/431; 524/430; 524/495; 524/496
[58] Field of Search ................... 524/495, 496, 524/497, 430, 504, 515, 431

[56] References Cited

U.S. PATENT DOCUMENTS

| | | | |
|---|---|---|---|
| 4,243,577 | 1/1981 | Chiao | 260/42.47 |
| 4,307,047 | 12/1981 | Edinger et al. | 264/25 |
| 4,391,764 | 7/1983 | Edinger et al. | 264/25 |
| 4,401,992 | 8/1983 | Vorst et al. | 346/762 |
| 4,490,507 | 12/1984 | Abe et al. | 525/263 |
| 5,302,647 | 4/1994 | Suzuki et al. | 524/141 |
| 5,373,039 | 12/1994 | Sakai et al. | 524/100 |
| 5,560,845 | 10/1996 | Birmingham, Jr. et al. | 219/121.85 |

FOREIGN PATENT DOCUMENTS

| | | |
|---|---|---|
| 0 675 168 | 10/1995 | European Pat. Off. . |
| 6807707 | 12/1968 | Netherlands . |

OTHER PUBLICATIONS

Rapra Abstracts, vol. 29, No. 2, Feb. 1, 1992, p. 87. D. K. Chen, et al., "Characterisation of EMI Shielding ABS Composites".

Chemical Abstracts, vol. 102, No. 12, Mar. 25, 1985, An-96636, JP-A-59-166553, Sep. 19, 1984.

Primary Examiner—Vasu Jagannathan
Assistant Examiner—U. K. Rajguru
Attorney, Agent, or Firm—Oblon, Spivak, McClelland, Maier & Neustadt, P.C.

[57] ABSTRACT

A laser marking resin composition excellent in appearance of molded article and impact resistance which comprises:

(A) 100 parts by weight of a rubber-reinforced vinyl resin consisting of:

(A-1) 1 to 100% by weight of a rubber-reinforced resin having a grafting degree of 5 to 150% by weight obtained by polymerizing, in the presence of (a) 5 to 70% by weight of a rubbery polymer, (b) 95 to 30% by weight of at least one monomer selected from the group consisting of an aromatic vinyl compound, a vinyl cyanide compound, a (meth)acrylic acid ester, maleic anhydride and a maleimide compound, provided that (a)+(b)=100% by weight, and (A-2) 99 to 0% by weight of a polymer obtained by polymerizing at least one monomer selected from the group consisting of an aromatic vinyl compound, a vinyl cyanide compound, a (meth)acrylic acid ester, maleic anhydride and a maleimide compound, provided that (A-1)+(A-2)=100% by weight, the matrix resin in the component (A) having an intrinsic viscosity [η] of 0.1 to 1.5 dl/g as measured in methyl ethyl ketone at 30° C., and (B) 0.01 to 30 parts by weight of at least one compound selected from the group consisting of (B-1) titanium black, (B-2) black iron oxide, (B-3) yellow iron oxide and (B-4) carbon black.

20 Claims, No Drawings

LASER MARKING RESIN COMPOSITION

BACKGROUND OF THE INVENTION

This invention relates to a laser marking resin composition excellent in appearance of molded article and impact resistance, on the resin surface of which sharp marking is possible upon irradiation with a laser.

When graphic symbols and the like are marked on the surface of an article, for example, a plastic molded article such as an electrical article, an electronic part or the like; a semiconductor; or the like, tampo printing, silk screen printing and the like have heretofore been used. However, these methods have such problems that an ink is scattered, a stencil-plate is required and the marking on fine parts is difficult. In order to solve these problems, a laser marking method has recently been carried out.

The term "laser marking" means herein that the surface of a molded article is irradiated with a laser to remove a part thereof by vaporization or pyrolysis. A laser marking method by which the unirradiated portion and the irradiated portion (graphical symbol portion) are distinguished has been carried out. However, this method has such a problem that the degree of coloration and the sharpness of color become insufficient depending upon the material of parts to be laser-marked, the kind of resin to be used and the like.

SUMMARY OF THE INVENTION

This invention has been made for solving the above-mentioned prior art problems and aims at providing a laser marking resin composition in which a specific metal-containing compound is added to a rubber-reinforced vinyl resin, whereby markings excellent in degree of coloration and sharpness are obtained upon irradiation with a laser without deteriorating the appearance of molded article and impact resistance which are the features characteristic of the rubber-reinforced vinyl resin.

According to this invention, there is provided a laser marking resin composition excellent in appearance of molded article and impact resistance which comprises:

(A) 100 parts by weight of a rubber-reinforced vinyl resin consisting of:

(A-1) 1 to 100% by weight of a rubber-reinforced resin having a grafting degree of 5 to 150% by weight obtained by polymerizing, in the presence of (a) 5 to 70% by weight of a rubbery polymer, (b) 95 to 30% by weight of at least one monomer selected from the group consisting of an aromatic vinyl compound, a vinyl cyanide compound, a (meth)acrylic acid ester, maleic anhydride and a maleimide compound, provided that (a)+(b)=100% by weight, and (A-2) 99 to 0% by weight of a polymer obtained by polymerizing at least one monomer selected from the group consisting of an aromatic vinyl compound, a vinyl cyanide compound, a (meth)acrylic acid ester, maleic anhydride and a maleimide compound, provided that (A-1)+(A-2)=100% by weight, the matrix resin in the component (A) having an intrinsic viscosity [η] of 0.1 to 1.5 dl/g as measured in methyl ethyl ketone at 30° C., and (B) 0.01 to 40 parts by weight of at least one compound selected from the group consisting of (B-1) titanium black, (B-2) black iron oxide, (B-3) yellow iron oxide and (B-4) carbon black.

DETAILED DESCRIPTION OF THE INVENTION

The rubber-reinforced vinyl resin (A) is explained in detail below.

The rubber-reinforced vinyl resin (A) used in this invention is a resin consisting of (A-1) a rubber-reinforced resin and/or (A-2) a polymer.

The rubber-reinforced resin (A-1) is a rubber-reinforced resin obtained by polymerizing, in the presence of (a) 5 to 70% by weight, preferably 12 to 60% by weight and more preferably 15 to 50% by weight of a rubbery polymer, (b) 95 to 30% by weight, preferably 88 to 40% by weight and more preferably 85 to 50% by weight of at least one monomer selected from the group consisting of an aromatic vinyl compound, a vinyl cyanide compound, a (meth)acrylic acid ester, maleic anhydride and a maleimide compound, provided that (a)+(b)=100% by weight.

The polymer (A-2) is a polymer obtained by polymerizing the above-mentioned monomer component (b).

The rubbery polymer (a) includes polybutadiene, butadiene-styrene copolymer, polyisoprene, butadiene-acrylonitrile copolymer, ethylene-propylene-(non-conjugated diene) copolymers, ethylene-butene-1-(non-conjugated diene) copolymers, isobutylene-isoprene copolymer, acrylic rubbers, styrene-butadiene-styrene block copolymer, styrene-butadiene-styrene radial teleblock copolymer, styrene-isoprene-styrene block copolymer, hydrogenated diene (block, random and homo) polymers such as SEBS and the like, polyurethane rubber, silicone rubber, etc. Among them, polybutadiene, butadiene-styrene copolymer, ethylene-propylene-(non-conjugated diene) copolymers, ethylene-butene-1-(non-conjugated diene) copolymers, hydrogenated diene polymers and silicone rubber are preferred.

In particular, when the silicone rubber is used in an amount of 5% by weight or more in the rubbery polymer (a), sharp laser marking becomes possible.

Also, when the silicone rubber is contained in an amount of 5% by weight or more in the rubbery polymer (a), the laser marking resin composition of this invention obtained is excellent in sliding properties.

The above aromatic vinyl compound includes styrene, α-methylstyrene, o-methylstyrene, m-methylstyrene, p-methylstyrene, p-hydroxystyrene, α-ethylstyrene, methyl-α-methylstyrene, -dimethylstyrene, sodium styrenesulfonate and the like. Among them, styrene, p-methylstyrene and α-methylstyrene are preferred.

The above vinyl cyanide compound includes acrylonitrile, methacrylonitrile and the like. Among them, acrylonitrile is preferred.

The above (meth)acrylic acid ester includes methyl acrylate, ethyl acrylate, butyl acrylate, methyl methacrylate, ethyl methacrylate, butyl methacrylate and the like. Among them, methyl methacrylate and butyl acrylate are preferred.

The above maleimide compound includes maleimide, N-methylmaleimide, N-ethylmaleimide, N-cyclohexylmaleimide, N-phenylmaleimide, N-(2-methylphenyl)maleimide, N-(2,6-diethylphenyl)maleimide, N-(4-carboxyphenyl)maleimide, N-(4-hydroxyphenyl)maleimide, N-(4-bromophenyl)maleimide and the like. Among them, N-phenylmaleimide and N-cyclohexylmaleimide are preferred.

When the content of the rubbery polymer (a) in the rubber-reinforced resin (A-1) is less than 5% by weight, the impact resistance is not sufficient, while when the content is more than 70% by weight, the grafting degree, the surface gloss of resin and moldability are deteriorated.

The grafting degree of the rubber-reinforced resin (A-1) is 5 to 150% by weight, preferably 10 to 150% by weight and more preferably 10 to 120% by weight. When the grafting degree is less than 5% by weight, the rubber component-addition effect is not sufficient, for example, sufficient impact resistance is not obtained. On the other hand, when the grafting degree is more than 150% by weight, the moldability is inferior. In this case, the grafting degree is a value obtained from the following equation:

Grafting degree (%)={(y−x)/x}×100 in which x is the amount of the rubber component in 1 g of the component (A-1) and y is the amount of methyl ethyl ketone-insolubles in 1 g of the component (A-1).

The content of the aromatic vinyl compound in the polymer (A-2) is preferably 60 to 95% by weight, more preferably 65 to 70% by weight, and when the content is within the above range, a laser marking resin composition having excellent moldability is obtained.

The content of the vinyl cyanide compound in the polymer (A-2) is preferably 15 to 40% by weight, more preferably 20 to 30% by weight. When the content is within the above range, a resin excellent in moldability and laser marking is obtained.

Moreover, the content of the (meth)acrylic acid ester in the polymer (A-2) is preferably 30 to 100% by weight, more preferably 40 to 100% by weight, and when the content is within the above range, sharp laser marking is obtained.

The preferable combination of the monomers is a combination of at least two monomers selected from the group consisting of the aromatic vinyl compound, the vinyl cyanide compound and the (meth)acrylic acid ester.

The rubber-reinforced vinyl resin (A) of this invention consists of the rubber-reinforced resin (A-1) or a combination of the rubber-reinforced resin (A-1) and the polymer (A-2).

The proportions of the rubber-reinforced resin (A-1) and the polymer (A-2) blended are such that the proportion of the rubber-reinforced resin (A-1) is 1 to 100% by weight and the proportion of the polymer (A-2) is 99 to 0% by weight, preferably such that the proportion of the component (A-1) is 5 to 95% by weight and the proportion of the component (A-2) is 95 to 5% by weight, more preferably such that the proportion of the component (A-1) is 5 to 70% by weight and the proportion of the component (A-2) is 95 to 30% by weight, and particularly preferably such that the proportion of the component (A-1) is 20 to 60% by weight and the proportion of the component (A-2) is 80 to 40% by weight, provided that (A-1)+(A-2)=100% by weight. When the contents are within the above ranges, a laser marking resin composition much better in impact resistance and moldability is obtained.

The content of the (meth)acrylic acid ester in the rubber-reinforced vinyl resin (A) is preferably 20 to 80% by weight, more preferably 30 to 60% by weight, and particularly preferably 35 to 50% by weight. When the content of the (meth)acrylic acid ester is within this range, a laser marking resin composition giving a white marking which is particularly excellent in sharpness (contrast) is obtained.

The content of the vinyl cyanide compound in the rubber-reinforced vinyl resin (A) is preferably 10 to 50% by weight, more preferably 15 to 40% by weight and particularly preferably 17 to 30% by weight. When the content of the vinyl cyanide compound is within this range, a laser marking resin composition giving a black marking which is sharp and good in contrast is obtained.

The monomer component other than the rubbery polymer in the component (A) is preferably composed of at least two monomers selected from the group consisting of the aromatic vinyl compound, the vinyl cyanide compound and the (meth)acrylic acid ester.

The intrinsic viscosity [η] of the matrix resin of the component (A) as measured in methyl ethyl ketone at 30° C. is 0.1 to 1.5 dl/g, preferably 0.3 to 1.0 dl/g. When the intrinsic viscosity [η] is less than 0.1 dl/g, a sufficient impact strength is not developed, while when it exceeds 1.5 dl/g, the moldability becomes low.

In this case, the matrix means the resin component other than the grafted rubber component in the component (A), and the intrinsic viscosity [η] is a value determined by measuring the viscosity of the resin component dissolved in methyl ethyl ketone of the component (A) in a conventional manner.

The rubber-reinforced resin (A-1) is obtained by a production method, for example, (i) a method which comprises polymerizing the monomer component (b) in the presence of the rubbery polymer (a); (ii) a graft blend method which comprises polymerizing a part of the monomer component (b) in the presence of the rubbery polymer (a), separately polymerizing the remaining monomer component (b) and then blending the two; or the like.

The polymer (A-2) is obtained, for example, (iii) by the same production method as the above method (i) or (ii), except that the rubbery polymer (a) is not used.

The component (A) has preferably the following compositions; however, this invention is not limited thereto:

(1) ABS resin (or AES resin)
(2) ABS resin/AS resin
(3) ABS resin/methyl methacrylate-styrene-acrylonitrile copolymer (MMA-ST-AN copolymer)
(4) ABS resin/silicone rubber-modified resin/PMMA
(5) Silicone rubber-modified resin/MMA-ST-AN copolymer/PMMA When as the above component (A-1), a rubber-reinforced resin comprising 3 to 40% by weight of the rubbery polymer, 10 to 97% by weight of the polymerized (meth)acrylic acid ester and 0 to 87% by weight of the polymerized other vinyl monomers and having a grafting degree of 10 to 150% by weight is used, an excellent, sharp marking is obtained.

In said rubber-reinforced resin (A-1), the content of the polymerized (meth)acrylic acid ester is 10 to 97% by weight, preferably 20 to 75% by weight and more preferably 35 to 55% by weight. The content of the polymerized other vinyl monomers is 0 to 87% by weight, preferably 0 to 76% by weight and more preferably 0 to 60% by weight. The content of the rubbery polymer (the grafted components are excluded) is 3 to 40% by weight, preferably 4 to 30% by weight and more preferably 5 to 25% by weight.

The rubber-reinforced vinyl resin (A) may be mixed with (C) a (meth)acrylic acid ester polymer comprising 50 to 100% by weight of the polymerized (meth)acrylic acid ester and having a melt flow rate (MFR) of 1 to 30 g/10 min as measured at 220° C. under a load of 10 kg, preferably in such a proportion that the component (A)/the component (C) weight ratio is 80-4/20-96. When the mixture of the component (A) and the component (C) is blended with the component (B) so that the proportion of the component (B) becomes 0.01 to 40 parts by weight per 100 parts by weight of the rubber-reinforced vinyl resin (A), a much superior, sharp laser marking is obtained.

The melt flow rate (MFR) of the component (C) refers to a melt flow rate (MFR) as measured at 220° C. under a load of 10 kg and its value is 1 to 30 g/10 min, preferably 3 to 28 g/10 min and more preferably 5 to 25 g/10 min.

When the melt flow rate (MFR) of the component (C) is less than 1 g/10 min, the moldability becomes low, while when it is more than 30 g/10 min, it is difficult to obtain a sharp white marking.

By using the component (C) having a melt flow rate (MFR) within the scope of this invention, a laser marking resin composition which is excellent in both moldability and sharpness of white marking is obtained.

The component (A)/the component (C) weight ratio is preferably 80-4/20-96, more preferably 70-25/30-75, and particularly preferably 60-45/40-55.

The rubber-reinforced vinyl resin (A) may be blended with (D) a flame retardant, preferably in such a proportion that the component (A)/the component (D) weight ratio is 99-70/1-30. When the resulting resin/flame-retardant mixture is blended with the component (B) so that the proportion of the component (B) is 0.01 to 40 parts by weight per 100 parts of the component (A), a laser marking resin composition which shows a sharp marking on the resin surface and is excellent in moldability, surface gloss of molded article, impact resistance and flame-retardancy is obtained.

In said mixture, the weight ratio of the rubber-reinforced vinyl resin (A) to the flame retardant (D) is preferably 99-70/1-30, more preferably 95-70/5-30 and particularly preferably 90-75/10-25.

The flame-retardant (D) used in this invention consists of a bromine-containing flame-retardant (D-1), a phosphorus-containing flame-retardant (D-2) or a mixture of the components (D-1) and (D-2).

The bromine-containing flame-retardant (D-1) includes, for example, tetrabromobisphenol A, tetrabromobisphenol A-bis(2-hydroxyethyl ether), an oligomer (terminated with an epoxy group, a tribromophenoxy group or the like) of tetrabromobisphenol A, polycarbonate oligomer of tetrabromobisphenol A, polycarbonate oligomer of tetrabromobisphenol S, decabromodiphenyl ether, octabromodiphenyl ether, bis(tribromophenoxy)ethane and the like. Oligomer (terminated with an epoxy group, a tribromophenoxy group or the like) of tetrabromobisphenol A and polycarbonate oligomer of tetrabromobisphenol A are preferred.

The bromine-containing flame-retardant (D-1) has a softening point of, preferably 80° to 350° C., more preferably 100° to 280° C. When the softening point (melting point) of the bromine-containing flame-retardant (D-1) is within the above range, a laser marking resin composition having a good moldability is obtained.

The above-mentioned compounds are preferably used as the bromine-containing flame-retardant (D-1) and can serve for enhancing the laser marking properties (particularly black letter-developability) because when the compound is irradiated with a laser, debromination reaction is caused, and the radical of the benzene ring produced is reacted with another benzene ring to extend the conjugated chain.

The phosphorus-containing flame-retardant (D-2) includes, for example, organic phosphorus-containing compounds, red phosphorus, phosphazene compounds, ammonium polyphosphates and the like. Among them, organic phosphorus-containing compounds are preferred.

The organic phosphorus-containing compounds include phosphates, a representative of which is triphenyl phosphate; phosphites, a representative of which is triphenyl phosphite; and the like.

In this invention, as the organic phosphorus-containing compound, preferable are triphenyl phosphate, triphenyl thiophosphate, trixylenyl phosphate, trixylenyl thiophosphate, oligomer of triphenyl phosphate, hydroquinone bis(diphenylphosphate) and resorcinol bis (diphenylphosphate), and particularly preferable are triphenyl phosphate and hydroquinone bis(diphenylphosphate).

The phosphorus concentration of the phosphorus-containing flame-retardant (D-2) is preferably 4 to 30% by weight, more preferably 5 to 15% by weight.

Also, the melting point of the phosphorus-containing flame-retardant is preferably 30° to 150° C., more preferably 40° to 140° C.

In order to further enhance the flame-retardancy, there may be added an antimony compound, polytetrafluoroethylene or the like. The antimony compound includes antimony trioxide and antimony pentoxide. The amount of the antimony compound added is preferably 0.1 to 20 parts by weight, more preferably 0.5 to 10 parts by weight and particularly preferably 1 to 8 parts by weight, per 100 parts by weight of the resin/flame-retardant mixture. When the amount of the antimony compound is less than 0.1 part by weight, the flame-retarding effect is not sufficient enhanced, and when the amount exceeds 20 parts by weight, the impact resistance becomes inferior. The particle size of the antimony compound is preferably not more than 10 µm, more preferably not more than 5 µm and particularly preferably not more than 1 µm.

The polytetrafluoroethylene preferably has an average molecular weight of 100,000 to 5,000,000, an average particle size of 500 to 1,000 µm, a density of 100 to 1,000 g/liter, a melting point of 250° to 300° C. and a specific gravity of 1.8 to 2.5. The method of polymerizing polytetrafluoroethylene may be an emulsion polymerization, suspension polymerization or the like, and the suspension polymerization is particularly preferred.

Moreover, for preventing a flame-retardant from adhering, there can be used a terpolymerization type fluorine-containing polymer having a melting, dropping or softening point of 100° to 300° C., preferably 110° to 230° C. When the melting, dropping or softening point is less than 100° C. or more than 300° C., the thermal stability becomes inferior. The fluorine-containing polymer is prepared by copolymerization or terpolymerization of vinylidene fluoride, hexafluoropropylene and tetrafluoroethylene. A terpolymer of vinylidene fluoride, hexafluoropropylene and tetrafluoroethylene is particularly preferable. The fluorine content of the fluorine-containing polymer is preferably at least 50% by weight, more preferably 68 to 76% by weight.

The amount of the polytetrafluoroethylene added or the amount of the polytetrafluoroethylene and the fluorine-containing polymer added is preferably 0.01 to 10 parts by weight, more preferably 0.1 to 8 parts by weight, per 100 parts by weight of the resin composition consisting of the component (A) and the component (D).

When the amount of the polytetrafluoroethylene or the amount of the polytetrafluoroethylene and the fluorine-containing polymer is within the above range, the flame-retardancy enhancement (drip prevention) and the prevention of flame-retardant-adhesion can be effectively achieved.

The component (B) of this invention is explained below.

The characteristic feature of this invention lies in adding the component (B) to the rubber-reinforced vinyl resin (A) or a mixture of the rubber-reinforced vinyl resin (A) and the component (C) or (D), thereby obtaining a sharp laser marking having a sufficient coloration degree.

The component (B) is at least one compound selected from the group consisting of the following components (B-1) to (B-4):

(B-1) titanium black,
(B-2) black iron oxide,
(B-3) yellow iron oxide,
(B-4) carbon black.

The amount of the component (B) added is 0.01 to 40 parts by weight, preferably 0.05 to 30 parts by weight, more preferably 0.1 to 20 parts by weight, and most preferably 0.2 to 15 parts by weight, per 100 parts by weight of the rubber-reinforced vinyl resin (A) even when the mixture of the rubber-reinforced vinyl resin (A) and the component (C) or (D) is used.

When the amount of the component (B) added is less than 0.01 part by weight, a sharp laser marking is not obtained. When the amount is more than 40 parts by weight, the appearance of molded article and the impact resistance become inferior.

The titanium black (B-1) is titanium suboxide obtained by reduction treatment of titanium dioxide. The average particle size of the titanium black is preferably 0.001 to 0.8 μm, more preferably 0.01 to 0.5 μm and particularly preferably 0.1 to 0.4 μm. The ratio of titanium (Ti) to oxygen (O) in the elementary analysis is preferably 1/1.60 to 1/1.95, particularly preferably 1/1.80 to 1/1.90. Also, as a surface treating agent, there can be used aluminum oxide or tin oxide. When a titanium black within the above range is used, a sharp laser marking having a good contrast is obtained.

When a mixture of the rubber-reinforced vinyl resin (A) with the titanium black (B-1) is irradiated with a laser, a sharp white marking having a good contrast can be obtained.

The black iron oxide (B-2) is, for example, a compound having a chemical composition represented by the general formula $(FeO)_m \cdot (Fe_2O_3)_n$.

In the above general formula, m and n satisfy (m+n=2), preferably m=1 and n=1. The average particle size of the black iron oxide is preferably 0.10 to 1.50 μm, more preferably 0.15 to 1.2 μm and particularly preferably 0.2 to 1.0 μm. The shape of the particle is spherical or needle-like, and the spherical shape is preferred.

When a black iron oxide within the above range is used, a sharp laser marking having a good contrast is obtained.

When a mixture of the rubber-reinforced vinyl resin (A) with the black iron oxide (B-2) is irradiated with a laser, a sharp, brown or red marking having a good contrast can be obtained.

The yellow iron oxide (B-3) is a yellow compound having water of crystallization. The shape of particle is preferably needle-like and the particle size is preferably 0.01 to 0.5 μm (minor axis direction) and 0.5 to 1.0 μm (major axis direction), more preferably 0.05 to 0.3 μm (minor axis direction) and 0.5 to 0.9 μm (major axis direction).

The decomposition temperature of the yellow iron oxide is preferably at least 200° C., more preferably at least 250° C. and particularly preferably at least 270° C.

When a yellow iron oxide within the above range is used, a sharp laser marking having a good contrast is obtained.

When a rubber-reinforced vinyl resin (A) containing the yellow iron oxide (B-3) is irradiated with a laser, a sharp, red marking can be obtained.

The component (B-4) is carbon black. The carbon concentration of the component (B-4) is preferably at least 50%, more preferably at least 80% and particularly preferably at least 90%. Carbon black, animal charcoal, graphite, carbon fiber (including milled type) and powdered charcoal and the like can be used. The particle size is preferably 10 μm or less, more preferably 5 μm or less and particularly preferably 1 μm or less.

The laser with which the laser marking resin composition of this invention is marked is not critical and includes He—Ne laser, Ar laser, carbon dioxide laser, semiconductor laser, yttrium laser, aluminum laser, garnet laser (YAG), excimer laser and the like. YAG laser is preferred.

The laser marking method includes a mask exposure method and a dynamic focusing method, and when the latter is used a mark is electronically formed, so that a very flexible marking can be obtained.

The laser marking resin composition of this invention may further contain, if necessary, (E) at least one other thermoplastic resin material. Said other thermoplastic resin materials (E) include polyamides such as nylon 6, nylon 12, nylon 6,6, nylon 4,6 and the like; polyesters such as polybutylene phthalate (PBT), polyethylene terephthalate (PET) and the like; polyacetals such as polyphenylene sulfide (PPS), polyphenylene oxide (PPO), polyoxymethylene (POM) and the like; polyetheresteramides; polyetherimides; polyimides; polyetheretherketones (PEEK); polyarylates; silicone resins; chlorine-containing polymers such as vinyl chloride resin (PVC) and the like; fluorine-containing polymers; epoxy resins; polyurethanes; unsaturated polyesters; and thermoplastic elastomers. These thermoplastic resin materials may be used alone or in admixture of two or more.

When said at least one other thermoplastic resin material is blended with the rubber-reinforced vinyl resin (A), an excellent laser marking is obtained. In particular, a sharp marking is obtained by suitably combining the copolymerizing components (monomer components) of the component (A) with the component (E), for example, the following combinations:

(1) Component (A): (meth)acrylic acid ester [20–80% by weight of the component (A)]

Component (E): at least one member selected from polyolefins such as polyethylene, polypropylene and the like; polyoxymethylene; and polyamides (2) Component (A): vinyl cyanide compound [10 to 50% by weight of the component (A)]

Component (E): at least one member selected from polycarbonates, polyphenylene oxides, novolak resins, polyethylene terephthalate and polybutylene terephthalate.

With the above combination (1), a sharp, white laser marking is obtained, and with the above combination (2), a sharp, black laser marking is obtained.

The melting point of the polyethylene is preferably 100° to 140° C. and the glass transition temperature of the polyethylene is preferably −50° to −20° C.

The polypropylene may be freely selected from those of the random type, the block type, the homo type and the like. A polypropylene obtained by polymerization with a metallocene catalyst may also be used. The melt flow rate (MFR) of the polypropylene is preferably 1 to 70 g/10 min (230° C., 2.16 kg).

The melting point of the polyoxymethylene is preferably 170° to 180° C.

The polyamides include nylon 6, nylon 12, nylon 6,6, nylon 4,6 and the like. The relative viscosity of the polyamide is preferably 0.5 to 8.0 when a solution of 1 g of polymer in 100 ml of 98% sulfuric acid is measured at 25° C.

The polycarbonate may be any known one and aromatic polycarbonates are preferred. Particularly preferable is a polycarbonate obtained by reaction between bisphenol A and phosgene. It is preferable that the polycarbonate has a viscosity average molecular weight of 10,000 to 40,000, more preferably 17,000 to 35,000.

The polyphenylene oxide may be the product of polymerization of 2,6-dimethylphenol, and the solution viscosity of the polyphenylene oxide is preferably 0.10 to 0.80 dl/g as measured in chloroform at 30° C.

The melting point of the polybutylene phthalate is preferably 220° to 230° C. and the melt flow rate (MRF) thereof is preferably 1 to 50 g/10 min as measured at 240° C. under a load of 10 kg.

The novolak resin may be any known one and a carbonic acid type novolak resin is preferred. A novolak resin having 3 to 30 recurring phenol skeletons is also preferred. The softening point of the novolak resin is preferably 50° to 110° C.

The proportion of the at least one other thermoplastic resin material (E) blended is preferably 90 to 1% by weight, more preferably 60 to 2% by weight and particularly preferably 30 to 4% by weight, based on the total weight of the component (A) and the component (E). When the proportion is within the above range, there is obtained a resin composition having an excellent laser marking as aimed at by this invention and an excellent moldability.

In the production of the laser marking resin composition of this invention and the mixture thereof with other resin materials, a compatibilizing agent may be used for enhancing the compatibility between the polymers, whereby the impact resistance and surface appearance of molded article can be improved. The compatibilizing method includes a method in which the materials are kneaded in the presence of a functional unsaturated compound having at least one functional group selected from the group consisting of acid anhydride group, hydroxyl group, amino group, epoxy group, oxazoline group and imido group and if necessary a peroxide, a method in which a thermoplastic resin material having at least one of the above functional groups is used, and other like methods. The thermoplastic resin material polymer having at least one of the above functional groups is a random, block or graft copolymer of the above functional unsaturated compound with at least one other vinyl monomer copolymerizable therewith.

Specific examples of the compatibilizing agent include copolymers of styrene with the above functional unsaturated compound and if necessary at least one other vinyl monomer copolymerizable therewith such as styrene-glycidyl methacrylate copolymer, styrene-maleic anhydride copolymer, styrene-methacrylic acid copolymer, styrene-acrylonitrile-methacrylic acid copolymer and the like; and copolymers of ethylene with the above functional unsaturated compound and if necessary at least one other vinyl monomer copolymerizable therewith such as ethylene-glycidyl methacrylate copolymer, ethylene-glycidyl methacrylate-vinyl acetate copolymer and the like. These copolymers include these ethylene copolymers on which other polymers are grafted. Said other polymers to be grafted include polymers of radically polymerizable vinyl monomers, for example, polyalkyl (meth)acrylates, polystyrene, styrene-acrylonitrile copolymer, styrene-alkyl (meth)acrylate copolymers and the like.

The laser marking resin composition of this invention may contain a coloring agent. The coloring agent includes azo pigments, for example, monoazo and dis-azo compounds of the acetoacetoaryl type, the pyrazolone type, the 2,3-oxynaphthoylarylamide type, the barbituric acid type, the thiobarbituric acid type, the 2,4,6-triamino-1,3-pyrimidine type and the 3-cyano-4-methylpyridone type and metal salts of azo compounds and the like; and diazo pigments, for example, those of the acetoacetoaryl type, the pyrazolone type, the 2,3-oxynaphthoylarylamide type and the like, copper(II) phthalocyanine, chlorinated lead phthalocyanine, ultra-marine, Prussian blue, copper chromate, lead sulfo-chromate, and red iron oxide. Also dyes, near infrared absorbers and the like may be used as the coloring agent. Compounds which absorb, even partly, a wavelength of 200 to 2,000 nm can also be used as the coloring agent.

The proportion of the coloring agent added is preferably 0.001 to 10 parts by weight, more preferably 0.01 to 5 parts by weight, per 100 parts by weight of the laser marking resin composition of this invention.

The laser marking resin composition of this invention may further contain, if necessary, an additive, for example, a stabilizer such as anti-oxidant, ultraviolet absorber or the like; a lubricant such as silicone oil, low molecular weight polyethylene or the like; a filler such as calcium carbonate, talc, clay, titanium oxide, antimony oxide, copper oxide, zinc oxide, zinc borate, magnesium oxide, aluminum hydroxide, magnesium hydroxide, magnesium carbonate, calcium oxide, aluminum oxide, mica, glass beads, glass fiber, carbon fiber, aramid fiber, glass flake, thermally expansible graphite, metal filler or the like; a dispersing agent; a foaming agent; a coloring agent; or the like. Among them, glass fiber and carbon fiber have preferably such a shape that the fiber diameter is 6 to 60 μm and the fiber length is 30 μm or more.

The proportion of these additives added is preferably 0.01 to 100 parts by weight per 100 parts by weight of the laser marking resin composition of this invention.

Preparation of laser marking resin composition

The laser marking resin composition of this invention can be prepared by kneading all the components at a temperature of, preferably, 200° to 300° C. by means of an extruder, a Banbury mixer, a kneader, a twin roll or the like. In the kneading, all the components are kneaded at one time or alternatively a multistage kneading method by which some of the components are first kneaded and then the remaining components are added thereto and then kneaded can be adopted. The kneading method is preferably a method in which the components are kneaded in an extruder, and the extruder is particularly preferably a twin screw extruder.

The laser marking resin composition of this invention can be formed into a molded article by a molding means such as extrusion molding, injection molding, compression molding or the like and are excellent in laser markability, impact resistance and practical moldability and very useful as an article such as domestic article, electrical apparatus, OA apparatus, or the like; parts of automobile or the like; or constructional materials. In particular, the laser marking resin composition of this invention is very useful for a key top material and key board requiring a laser markability and a molded article requiring a bar cord by laser marking.

DESCRIPTION OF THE PREFERRED EMBODIMENTS

Examples are shown to explain this invention in more detail below. However, this invention should not be construed to be limited to the Examples.

Incidentally, in the Examples, part and % are by weight unless otherwise specified.

Examples 1 to 6 and Comparative Examples 1 to 3

Preparation of the component (A)

As the component (A), the following were used:

Graft copolymer (a-1)

In a separable flask equipped with a reflux condenser, a thermometer and a stirrer were placed, as the initial components, 40 parts (as solids) of polybutadiene rubber latex, 65 parts of deionized water, 0.35 part of rosin soap, 15 parts of styrene and 5 parts of acrylonitrile, and subsequently, a solution obtained by dissolving 0.2 part of sodium pyrophosphate, 0.01 part of ferrous sulfate heptahydrate and 0.4 part of glucose in 20 parts of deionized water was added thereto. Thereafter, 0.07 part of cumene hydroperoxide was added thereto to start polymerization and the polymerization was conducted for 1 hour, after which as an increment component, 45 parts of deionized water, 0.7 part of rosin soap, 30 parts of styrene, 10 parts of acrylonitrile and 0.01 part of cumene hydroperoxide were continuously added thereto over 2 hours and further subjected to polymerization over 1 hour to complete the reaction. Sulfuric acid was added to the copolymer latex obtained to coagulate the copolymer which was then washed and dried to obtain a graft copolymer [referred to hereinafter as the graft copolymer (a-1)]. The intrinsic viscosity [η] of the graft copolymer was 0.45 dl/g as measured in methyl ethyl ketone at 30° C., and the grafting degree was 55%.

Graft copolymer (a-2)

In the same manner as in the production of the graft copolymer (a-1), except that the monomers shown in Table 1 were used, polymerization was conducted to complete the reaction, thereby obtaining a graft copolymer [referred to hereinafter as the graft copolymer (a-2)].

TABLE 1

| Polymerization recipe of graft copolymer (part) (Initial component)/ | Graft copolymer | |
|---|---|---|
| (Increment component) | a-1 | a-2 |
| Polybutadiene | 40/0 | 35/0 |
| Styrene | 15/30 | 10/25 |
| Acrylonitrile | 5/10 | 3/7 |
| Methyl methacrylate | | 5/15 |

Polyorganosiloxane-reinforced resin (a-3)

Production of polyorganosiloxane-containing copolymer

With 1.5 parts of p-vinylphenylmethyldimethoxysilane was mixed 98.5 parts of octamethylcyclotetrasilane, and the resulting mixture was placed in a solution of 2.0 parts of dodecylbenzenesulfonic acid in 300 parts of distilled water, after which they were stirred for 3 minutes by means of a homomixer to emulsify and disperse the mixture in the solution.

This mixed solution was transferred to a separable flask equipped with a condenser, a nitrogen-introducing inlet and a stirrer, and heated at 90° C. for 6 hours with stirring, and thereafter cooled at 5° C. for 24 hours to complete the condensation.

The degree of condensation of octamethylcyclotetrasiloxane in the polyorganosiloxane-containing polymer obtained was 92.8%.

This polyorganosiloxane-containing polymer latex was neutralized to pH 7 with an aqueous sodium carbonate solution.

Production of polyorganosiloxane-reinforced resin (a-3)

In a 7-liter glass flask equipped with a stirrer was placed a batch polymerization component consisting of 100 parts of deionized water, 0.5 part of sodium dodecylbenzenesulfonate, 0.01 part of potassium hydroxide, 0.1 part of t-dodecylmercaptan, 40 parts of the above polyorganosiloxane-containing polymer, 15 parts of styrene and 5 parts of acrylonitrile, and the temperature was elevated with stirring.

When the temperature reached 45° C., an aqueous activating agent solution consisting of 0.1 part of sodium ethylenediaminetetracetate, 0.003 part of ferrous sulfate heptahydrate, 0.2 part of formaldehydesodium sulfoxylate dihydrate and 15 parts of deionized water, and 0.1 part of diisopropylbenzene hydroperoxide were added thereto and reaction was continued for 1 hour.

Moreover, a increment component mixture consisting of 50 parts of deionized water, 1 part of sodium dodecylbenzenesulfonate, 0.02 part of potassium hydroxide, 0.1 part of t-dodecylmercaptan, 0.2 part of diisopropylbenzene hydroperoxide, 30 parts of styrene and 10 parts of acrylonitrile was continuously added over 3 hours and reaction was continued.

After completion of the reaction, the reaction was further continued for 1 hour with stirring, and thereafter, 0.2 part of 2,2-methylene-bis(4-ethylene-6-t-butylphenol) was added, after which the reaction product was taken out of the flask.

Subsequently, the reaction product was coagulated with 2 parts of potassium chloride, dehydrated, washed with water and then dried, to obtain a powdery polyorganosiloxane-reinforced resin [referred to hereinafter as the polyorganosiloxane-reinforced resin (a-3)]. The intrinsic viscosity [η] of the polyorganosiloxane-reinforced resin was 0.51 dl/g and the grafting degree thereof was 96%.

Polymer (b-1)

In a separable flask equipped with a reflux condenser, a thermometer and a stirrer were placed 250 parts of deionized water, 3.0 parts of potassium rosinate, 70 parts of styrene, 30 parts of acrylonitrile and 0.1 part of t-dodecylmercaptan, and thereto was subsequently added a solution obtained by dissolving 0.05 part of sodium ethylenediaminetetracetate, 0.002 part of ferrous sulfate heptahydrate and 0.1 part of formaldehyde sodium sulfoxylate in 8 parts of deionized water, after which 0.1 part of diisopropylbenzene hydroperoxide was added thereto to start polymerization. Thereafter, the polymerization was continued for about 1 hour to complete the reaction. Sulfuric acid was added to the resulting polymer latex to coagulate the polymer which was then washed with water and then dried to obtain a polymer [referred to hereinafter as the polymer (b-1)]. The intrinsic viscosity [η] of the polymer was 0.50 dl/g.

Polymer (b-2)

In the same manner as in the production of the polymer (b-1), except that 40 parts of styrene, 15 parts of acrylonitrile and 45 parts of methyl methacrylate were used, polymerization was conducted to complete the reaction, thereby obtaining a polymer [referred to hereinafter as the polymer (b-2)].

Polymer (b-3)

Polymethyl methacrylate (Parapet GF, a trade name of Kureha Chemical Industry Co., Ltd.) was used.

Polymer (b-4)

To emulsion polymerization were subjected 54 parts of styrene, 17 parts of acrylonitrile and 29 parts of N-phenylmaleimide to obtain a polymer [referred to hereinafter as the polymer (b-4)].

Polymer (b-5)

In the same manner as in the case of the polymer (b-2), except that 20 parts of styrene, 25 parts of acrylonitrile and 55 parts of methyl methacrylate were used, a polymer was obtained [referred to hereinafter as the polymer (b-5)].

Preparation of other resin materials

As other resin materials, polybutylene terephthalate (PBT) [PBT-120, a trade name of KANEBO LTD.] was used.

Preparation and evaluation of laser marking resin composition

Each of the components shown in Table 2 was melt-kneaded in an extruder having an inner diameter of 50 mm at a temperature of 190° to 240° C. to produce pellets. The pellets thus obtained were molded by a 5-oz injection molding machine at a molding temperature of 200° to 240° C. to form test pieces, and the laser markability and physical properties thereof were evaluated. The results obtained are shown in Table 2.

Incidentally, the evaluation of physical properties was as follows:

Izod impact strength

ASTM D256 (¼", 23° C., notched)

Appearance of molded article

The appearance of injection molded article was judged visually.

Good o>Δ>x Bad

Laser markability

Evaluated using LBU 2001 of Barzel.

Laser: Nd:YAG laser (wavelength: 1.06 μm)

As the component (C), a polymer composed of 100% by weight of methyl methacrylate was used.

(C-1): That having a MFR of 16 as measured at 220° C. under a load of 10 kg.

(C-2): That having a MFR of 150 as measured at 220° C. under a load of 10 kg.

[Other resins (E)]

PBT: Polybutylene terephthalate

Epoxy-modified resin: Styrene-acrylonitrile-glycidyl methacrylate copolymer

[Production of laser marking rubber-reinforced vinyl resin]

Each of the components shown in Table 3 was melt-kneaded by means of an extruder having an inner diameter of 50 mm at a temperature of 190° to 240° C. to prepare pellets.

TABLE 2

|  |  | Example |  |  |  |  |  |  | Comparative Example |  |  |  |
|---|---|---|---|---|---|---|---|---|---|---|---|---|
|  |  | 1 | 2 | 3 | 4 | 5 | 6 | 7 | 1 | 2 | 3 | 4 |
| Component (A) | (part) | 100 | 100 | 100 | 80 | 100 | 100 | 100 | 100 | 100 | 100 | 100 |
| a-1 | (%) | 40 |  |  | 40 |  | 25 | 40 |  | 40 |  |  |
| a-2 | (%) |  | 40 |  |  | 40 |  |  |  |  | 40 | 40 |
| a-3 | (%) |  |  | 24 |  |  |  |  |  | 60 | 40 | 60 |
| (b-1) AS | (%) |  | 60 |  | 60 |  | 75 | 30 | 100 |  | 20 |  |
| (b-2) MMA-copolymerized AS | (%) | 60 |  | 56 |  | 60 |  |  | 5 |  |  |  |
| (b-3) |  |  |  | 20 |  |  |  |  |  | 35 |  |  |
| (b-4) |  |  |  |  |  |  |  | 30 |  |  |  |  |
| Component (B) | (part) |  |  |  |  |  |  |  |  |  |  |  |
| (B-1) Titanium black |  | 1 |  | 1 |  | 1 | 0.02 |  |  |  |  |  |
| (B-2) Black iron oxide |  |  | 1 |  |  |  |  | 1 |  |  |  |  |
| (B-3) Yellow iron oxide |  |  |  |  | 1 |  |  |  |  |  |  |  |
| (B-4) Carbon black |  | 0.05 |  | 0.17 |  |  |  |  |  |  |  |  |
| Other resins | (part) |  |  |  |  |  |  |  |  |  |  |  |
| PBT |  |  |  |  | 16 |  |  |  |  |  |  |  |
| Epoxy-modified resin |  |  |  |  | 4 |  |  |  |  |  |  |  |
| Coloring agent | (part) |  |  |  |  |  |  |  |  |  |  |  |
| Titanium yellow |  |  |  |  | 0.5 |  |  |  |  |  |  |  |
| Ultramarine |  |  |  |  |  | 0.1 | 1.3 |  |  |  |  | 0.5 |
| Aluminum hydroxide |  |  |  |  |  |  |  |  |  |  |  | 5 |
| Color of test piece (unirradiated) |  | Black | Black | Black | Yellow | Black | Dark blue | Black | Black | Black | White | Yellow |
| Color of marked portion |  | White | Red-Brown | White | Red | White | Black | Red-Brown | White | Red-Brown | Pale white | Pale white |
| Sharpness of mark (visually judged) |  | o | o | ⊚ | o | o | o | o | o | o | x | Δ-x |
| Appearance of molded article (visually judged) |  | o | o | o | o | o | o | o | Δ | o | o | o |
| Izod impact strength (J/m) |  | 180 | 176 | 187 | 176 | 176 | 156 | 118 | 30 | 49 | 176 | 176 |

As is clear from Table 2, the laser marking resin compositions of Examples 1 to 5 gave sharp laser markings having a good contrast.

On the other hand, in Comparative Example 1, the amount of the rubber in the component (A) was smaller than the scope of this invention, and hence, the impact strength was inferior.

In Comparative Example 2, the amount of the component (B) exceeded the scope of this invention, and hence, the laser marking was good, but the impact strength was inferior.

Comparative Example 3 is an example in which the component (B) was not contained, and hence, sharp laser marking was not obtained.

Examples 8 to 11 and Comparative Example 5

[Methyl methacrylate resin (C)]

The pellets obtained were molded by a 5-oz injection molding machine at a molding temperature of 200° to 240° C. to prepare test pieces, and the laser markability thereof was evaluated.

As is clear from the results shown in Table 3, in Examples 8 to 11, a marking excellent in sharpness was obtained. In addition, the appearance of molded article, moldability and impact resistance were excellent.

In Comparative Example 5, the rubbery polymer content was smaller than the scope of this invention and the methacrylic acid ester content was larger than the scope of this invention, so that the impact resistance and moldability were inferior.

TABLE 3

|  | Example 8 | Example 9 | Example 10 | Example 11 | Comp. Ex. 5 |
|---|---|---|---|---|---|
| Component (A) (part) | | | | | |
| a-1 | 20 | | | | |
| a-3 | | 35 | 25 | 30 | |
| b-1 | 30 | | | | |
| b-5 | | 45 | 35 | 40 | |
| Component (C) | | | | | |
| c-1 | 50 | 20 | 20 | | 100 |
| c-2 | | | | 30 | |
| Component (E) | | | | | |
| PBT | | | 16 | | |
| Epoxy-modified resin | | | 4 | | |
| MMA content (%) | 50 | 45 | 41 | 52 | 100 |
| Rubber content (%) | 8 | 14 | 10 | 12 | 0 |
| Physical properties | | | | | |
| Sharpness[1] | o | o | o | o | o |
| Appearance[2] | o | o | o | o | o |
| Moldability[3] | o | o | o | o | x |
| Izod impacts strength | 15 | 14 | 12 | 10 | 5 |

Note:
[1] Letter marked by YAG laser was visually judged.
o: Good, Δ: Fairly good, x: Bad
[2] Appearance of molded article was visually judged.
o: Good, Δ: Fairly good, x: Bad
[3] Judged when injection-molded.
o: Good, Δ: Fairly good, x: Bad Examples 12 to 28

In the same manner as in the case of the graft copolymer (a-1), the graft copolymers (a-4) and (a-5) shown in Table 4 were produced, and in the same manner as in the case of the polyorganosiloxane-reinforced resin (a-3), the graft copolymer (a-6) shown in Table 5 was produced.

TABLE 4

| | Graft copolymer (A-1) | |
|---|---|---|
| Composition of graft copolymer (part) | a-4 | a-5 |
| Polybutadiene | 40 | 20 |
| Styrene | 30 (15/20)* | 80 (20/60)* |
| Acrylonitrile | 25 (10/15)* | |
| [η] (MEK-solubles, 30° C.) (dl/g) | 0.45 | 0.40 |
| Grafting degree (%) | 55 | 45 |

Note:
*(parts in batch/parts in increment)

TABLE 5

| | Graft copolymer (A-1) |
|---|---|
| | a-6 |
| Composition of feed in batch polymerization (%) | |
| Polyorganosiloxane polymer [Component (C)] | 40 |
| Styrene | 15 |
| Acrylonitrile | 5 |
| Composition of feed in increment polymerization (%) | |
| Styrene | 25 |
| Acrylonitrile | 15 |
| [η] (MEK-solubles, 30° C.) (dl/g) | 0.54 |
| Grafting degree (%) | 97 |

[Flame-retardant (D)]

Flame-retardant D-1

A tribromophenol-endblocked, epoxy terminated oligomer consisting of tetrabromobisphenol A and epichlorohyrin having a molecular weight of about 2,000 was used.

Flame-retardant D-2

Brominated polyphenylene ether PO64P manufactured by GREAT LAKES CHEMICAL CORPORATION was used.

Flame-retardant D-3

Triphenyl phosphate was used as a phosphorus-containing flame-retardant.

[Other resins (E)]

PA: Polyamide resin
PBT: Polybutylene terephthalate
PP: MAC 3 manufactured by MITUBISHI CHEMICAL CO. INC.
POM: Polyoxymethylene M-90 manufactured by Poly plastic Co., Ltd.
Compatibilizing agent-1: Methacrylic acid-styrene-acrylonitrile copolymer (methacrylic acid/ST/AN=5/70/25 by weight)
Compatibilizing agent-2: Ethylene-glycidyl dimethacrylate copolymer graft-copolymerized with AS resin Production of laser marking resin composition Each of the components shown in Tables 6 and 7 was melt-kneaded by an extruder having an inner diameter of 50 mm at a temperature of 190° to 240° C. to prepare pellets. The pellets were molded by a 5-oz injection molding machine at a molding temperature of 200° to 240° C. to prepare test pieces, and the laser markability thereof was evaluated. The results obtained are shown in Tables 6 and 7.

Incidentally, the flame-retardancy was measured according to the horizontal burning test method of the UL-94 standards. NC means below the standards.

Test piece size: 1×16"×½"×5"

TABLE 6

| | | Example 12 | Example 13 | Example 14 | Example 15 | Example 16 | Example 17 | Example 18 |
|---|---|---|---|---|---|---|---|---|
| Component (A) | | | | | | | | |
| Sum of (A) + (B) | (part) | 100 | 100 | 100 | 100 | 100 | 87 | 64 |
| a-1 | | | 75 | 50 | | | | |
| a-2 | | 80 | | | | | 10 | |
| a-3 | | | | | | 40 | 30 | 24 |
| b-1 | | | | 25 | 80 | 35 | 22 | 20 |

TABLE 6-continued

|  |  | Example | | | | | | |
|---|---|---|---|---|---|---|---|---|
|  |  | 12 | 13 | 14 | 15 | 16 | 17 | 18 |
| b-2 |  |  |  |  |  |  |  |  |
| b-3 |  |  |  |  |  |  |  |  |
| b-4 |  |  |  |  |  |  |  |  |
| Component (D) | (part) |  |  |  |  |  |  |  |
| D-1 |  | 20 | 15 |  | 20 |  |  |  |
| D-2 |  |  |  | 25 |  | 25 | 25 | 20 |
| D-3 |  |  | 10 |  |  |  |  |  |
| Component (B) | (part) |  |  |  |  |  |  |  |
| Titanium black (B-1) |  |  | 0.5 |  |  |  |  |  |
| Black dye |  | 1 |  |  |  | 0.8 | 1 | 1 |
| Black iron oxide (B-2) |  |  |  | 0.08 |  | 0.05 |  |  |
| Carbon black (B-4) |  |  |  |  | 0.08 |  |  | 0.05 |
| Ultramarine |  |  | — |  | 1.00 |  |  |  |
| Titanium white |  |  | 1.50 |  |  |  |  |  |
| Component (E) | (part) |  |  |  |  |  |  |  |
| PA |  |  |  |  |  |  | 10 |  |
| PBT |  |  |  |  |  |  |  | 30 |
| Compatibilizing agent-1 |  |  |  |  |  |  | 3 |  |
| Compatibilizing agent-2 |  |  |  |  |  |  |  | 6 |
| Others |  |  |  |  |  |  |  |  |
| Antimony trioxide |  | 5 |  |  | 3 |  | 3 | 3 |
| AN content | (%) | 0 | 31 | 28 | 24 | 27 | 17 | 14 |
| MMA content | (%) | 0 | 0 | 0 | 0 | 0 | 0 | 0 |
| Rubber content | (%) | 16 | 30 | 20 | 0 | 16 | 14 | 10 |
| Physical Properties |  |  |  |  |  |  |  |  |
| Color of test piece (unirradicated) |  | Black | White | Gray | Blue | Gray | Black | Gray |
| Color of maked portion |  | Gray | Black | Black | Black | Black | Gray | Black |
| Sharpness[1] |  | ○ | ○ | ○ | ○ | ○ | ○ | ○ |
| Appearance[2] |  | ○ | ○ | ○ | ○ | ○ | ○ | ○ |
| Moldability[3] |  | ○ | ○ | ○ | ○ | ○ | ○ | ○ |
| Izod impact strength |  | 21 | 31 | 23 | 8 | 15 | 13 | 11 |
| Dynamic friction coefficient | (μ) | 0.50 | 0.49 | 0.47 | 0.45 | 0.26 | 0.33 | 0.37 |
| Wear | (mg) | 2.21 | 1.51 | 1.80 | 2.30 | 0.68 | 1.25 | 1.27 |
| Flame-retardancy |  | V-0 | V-2 | V-0 | V-0 | V-0 | V-0 | V-2 |

Note:
[1] Letter marked by YAG laser was visually judged.  ○: Good △: Fairly good x: Bad
[2] Appearance of molded article was visually judged.  ○: Good △: Fairly good x: Bad
[3] Judged when injection-molded.  ○: Good △: Fairly good x: Bad

TABLE 7

|  |  | Example | | | | | | | | | |
|---|---|---|---|---|---|---|---|---|---|---|---|
|  |  | 19 | 20 | 21 | 22 | 23 | 24 | 25 | 26 | 27 | 28 |
| Component (A) |  |  |  |  |  |  |  |  |  |  |  |
| Sum of (A) + (B) | (part) | 100 | 100 | 100 | 100 | 100 | 100 | 75 | 30 | 95 | 90 |
| a-4 |  | 30 | 20 |  |  |  |  |  | 5 | 25 | 25 |
| a-5 |  |  |  |  |  | 20 |  |  |  |  |  |
| a-6 |  |  |  |  |  |  | 30 | 20 |  | 10 | 15 |
| b-1 |  |  |  | 12 |  | 6 | 10 |  |  |  |  |
| b-2 |  |  |  | 40 | 75 | 30 |  | 20 | 30 | 40 | 35 |
| b-3 |  |  | 50 |  |  | 40 | 40 | 30 |  | 20 | 15 |
| b-4 |  |  |  |  |  |  | 10 |  |  |  |  |
| Component (D) | (part) |  |  |  |  |  |  |  |  |  |  |
| D-1 |  | 20 |  |  | 25 | 20 | 20 |  |  |  |  |
| D-2 |  |  | 28 | 25 |  |  |  | 25 | 25 |  |  |
| D-3 |  |  |  |  |  |  |  |  |  |  |  |
| Component (B) | (part) |  |  |  |  |  |  |  |  |  |  |
| Titanium black (B-1) |  |  |  |  | 0.08 |  | 0.1 |  |  | 0.5 | 0.5 |
| Black dye |  |  |  | 1 |  |  |  | 1 |  |  |  |
| Black iron oxide (B-2) |  | 0.5 |  |  |  | 0.08 |  | 0.01 |  |  |  |

TABLE 7-continued

| | | Example | | | | | | | | | |
|---|---|---|---|---|---|---|---|---|---|---|---|
| | | 19 | 20 | 21 | 22 | 23 | 24 | 25 | 26 | 27 | 28 |
| Carbon black (B-4) | | | 0.05 | | | | | | 0.08 | | 0.2 |
| Red iron oxide | | | | | 1.00 | | | | | | |
| Titanium white | | | | | | | | | | 1.0 | 1.5 |
| Component (E) | (part) | | | | | | | | | | |
| PA | | | | | | | | | 60 | | |
| PBT | | | | | | | 20 | | | | |
| PP | | | | | | | | | | 5 | |
| POM | | | | | | | | | | | 10 |
| Compatibilizing agent-1 | | | | | | | | | 10 | | |
| Compatibilizing agent-2 | | | | | | | | 5 | | | |
| Others | | | | | | | | | | | |
| Antimony trioxide | | 5 | 3 | 3 | | 5 | 3 | | | | |
| AN content | (%) | 13 | 18 | 11 | 6 | 5 | 13 | 11 | 2 | 14 | 15 |
| MMA content | (%) | 50 | 18 | 34 | 54 | 40 | 39 | 14 | 0 | 38 | 32 |
| Rubber content | (%) | 12 | 8 | 0 | 0 | 4 | 12 | 8 | 2 | 14 | 16 |
| Physical Properties | | | | | | | | | | | |
| Color of test piece (unirradiated) | | Black | Black | Black | Red | Gray | Black | Black | Black | Gray | Gray |
| Color of marked portion | | White | Gray | White | Gray | White | White | Gray | White | White | White |
| Sharpness[1] | | o | o | o | o | o | o | o | o | o | o |
| Appearance[2] | | o | o | o | o | o | o | o | o | o | o |
| Moldability[3] | | o | o | o | o | o | o | o | Δ | Δ | Δ |
| Izod impact strength | | 11 | 9 | 7 | 8 | 12 | 10 | 10 | 8 | 14 | 14 |
| Dynamic friction coefficient | (μ) | 0.47 | 0.51 | 0.54 | 0.35 | 0.38 | 0.39 | 0.46 | 0.43 | 0.31 | 0.28 |
| Wear | (mg) | 3.49 | 2.80 | 4.54 | 4.16 | 4.24 | 0.97 | 1.16 | 1.30 | 1.95 | 1.35 |
| Flame-retardancy | | V-0 | V-2 | V-2 | V-2 | V-0 | V-2 | V-2 | V-2 | HB | HB |

Note:
[1] Letter marked by YAG laser was visually judged.  o: Good  Δ: Fairly good  x: Bad
[2] Appearance of molded article was visually judged.  o: Good  Δ: Fairly good  x: Bad
[3] Judged when injection-molded.  o: Good  Δ: Fairly good  x: Bad

What is claimed is:

1. A laser marking resin composition excellent in appearance of molded article and impact resistance which consisting of:

(A) 100 parts by weight of a rubber-reinforced vinyl resin consisting of:

(A-1) 1 to 100% by weight of a rubber-reinforced resin having a grafting degree of 5 to 150% by weight obtained by polymerizing, in the presence of (a) 5 to 70% by weight of a rubbery polymer, (b) 95 to 30% by weight of at least one monomer selected from the group consisting of an aromatic vinyl compound, a vinyl cyanide compound, a (meth)acrylic acid ester, maleic anhydride and a maleimide compound, provided that (a)+(b)=100% by weight, and (A-2) 99 to 0% by weight of a polymer obtained by polymerizing at least one monomer selected from the group consisting of an aromatic vinyl compound, a vinyl cyanide compound, a (meth)acrylic acid ester, maleic anhydride and a maleimide compound, provided that (A-1)+(A-2)=100% by weight, the matrix resin in the component (A) having an intrinsic viscosity [η] of 0.1 to 1.5 dl/g as measured in methyl ethyl ketone at 30° C., and (B) 0.01 to 40 parts by weight of at least one compound selected from the group consisting of (B-1) titanium black, (B-2) black iron oxide and (B-3) yellow iron oxide.

2. The laser marking resin composition according to claim 1, wherein the rubber-reinforced resin (A-1) consists of 3 to 40% by weight of the rubbery polymer, 10 to 97% by weight of the polymerized (meth)acrylic acid ester and 0 to 87% by weight of the polymerized other vinyl monomers, and has a grafting degree of 10 to 150% by weight.

3. The laser marking resin composition according to claim 1, in which the rubber-reinforced vinyl resin (A) is in admixture with (C) a (meth)acrylic acid ester polymer having a polymerized (meth)acrylic acid ester content of 50 to 100% by weight and having a melt flow rate (MFR) of 1 to 30 g/10 min as measured at 220° C. under a load of 10 kg in such a proportion that the component (A)/the component (C) weight ratio is 4-80/96-20.

4. The laser marking resin composition according to claim 1, wherein the content of the polymerized vinyl cyanide compound in the component (A) is 10 to 50% by weight.

5. The laser marking resin composition according to claim 1, which further contains (D) a flame-retardant in such a proportion that the component (A)/the component (D) weight ratio is 99-70/1-30.

6. The laser marking resin composition according to claim 1, which further contains (E) at least one other thermoplastic resin than the component (A) in such a proportion that the component (A)/the component (E) weight ratio is 10-99/90-1.

7. The laser marking resin composition according to claim 6, which is a white laser marking resin composition and wherein the component (A) has a polymerized (meth)acrylic acid ester content of 20 to 80% by weight and the component (E) is at least one resin selected from the group consisting of polyolefin, polyoxymethylene (polyacetal) and polyamide.

8. The laser marking resin composition according to claim 6, which is a black laser marking laser resin composition and wherein the component (A) has a polymerized vinyl cyanide compound content of 10 to 50% by weight and the component (E) is at least one resin selected from the group consisting of polycarbonate, polyphenylene oxide, novolak resin, polyethylene terephthalate and polybutylene terephthalate.

9. The laser marking resin composition according to claim 1, wherein the rubbery polymer is selected from the group consisting of polybutadiene, butadiene-styrene copolymer, polyisoprene, butadiene-acrylonitrile copolymer, ethylene-propylene (non-conjugated diene) copolymers, ethylene (non-conjugated diene) copolymers, ethylene-butene-1 (non-conjugated diene) copolymers, isobutylene-isoprene copolymer, acrylic rubbers, styrene-butadiene-styrene block copolymer, styrene-butadiene-styrene radical teleblock copolymer, styrene-isoprene-styrene block copolymer, hydrogenated diene polymer, hydrogenated diene polymers, polyurethane rubber and silicone rubber.

10. The laser marking resin composition according to claim 9, wherein the rubber polymers contains silicone rubber in an amount of 5% by weight or more.

11. The laser marking resin composition according to claim 1, wherein the aromatic vinyl compound is selected from the group consisting of styrene, α-methylstyrene, o-methyl-, m-methyl, and p-methylstyrene, p-hydroxystyrene, α-methylstyrene, dimethylstyrene and sodium styrenesulfonate.

12. The laser marking resin composition according to claim 1, wherein the vinyl cyanide compound is selected from the group consisting of acrylonitrile and methacrylonitrile.

13. The laser marking resin composition according to claim 1, wherein the (meth)acrylic acid ester is selected from the group consisting of methyl acrylate, ethyl acrylate, butyl acrylate, methyl methacrylate, ethyl methacrylate and butyl methacrylate.

14. The laser marking resin composition according to claim 1, wherein the maleimide compound is selected from the group consisting of maleimide, N-methylmaleimide, N-ethylmaleimide, N-cyclohexymaleimide, N-phenylmaleimide, N-(2-methylphenyl) maleimide, N-(2, 6-diethylphenyl) maleimide, N-(4-carboxyphenyl) maleimide, N-(4-hydroxyphenyl) maleimide and N-(4-bromophenyl) maleimide.

15. The laser marking resin composition according to claim 1, wherein said matrix resin of component (A) has an intrinsic viscosity as measured in methyl ethyl ketone at 30° C. of 0.3 to 1.0 dl/g.

16. The laser marking resin composition according to claim 5, wherein said flame-retardant (D) is selected from the group consisting of a bromine-containing flame retardant and a phosphorus-containing flame retardant.

17. The laser marking resin composition according to claim 1, wherein said titanium black has an average particle size of about 0.001 to 0.8 μm, and an ratio of Ti to O by elementary analysis of from 1/1.60 to 1/1.95.

18. The laser marking resin composition according to claim 1, wherein said black iron oxide has an average particle size of from 0.10 to 1.50 μm.

19. The laser marking resin composition according to claim 1, wherein said yellow iron oxide has a particle size of from 0.01 to 0.5 μm (minor axis direction) and 0.5 to 1.0 μm (major axis direction), and having a decomposition temperature of at least 200° C.

20. The laser marking resin composition according to claim 19, wherein said yellow iron oxide has a decomposition temperature of at least 250° C.

* * * * *